Feb. 2, 1965   H. E. CLARY ETAL   3,168,162
NOISE FILTER
Filed Jan. 3, 1962   3 Sheets-Sheet 1
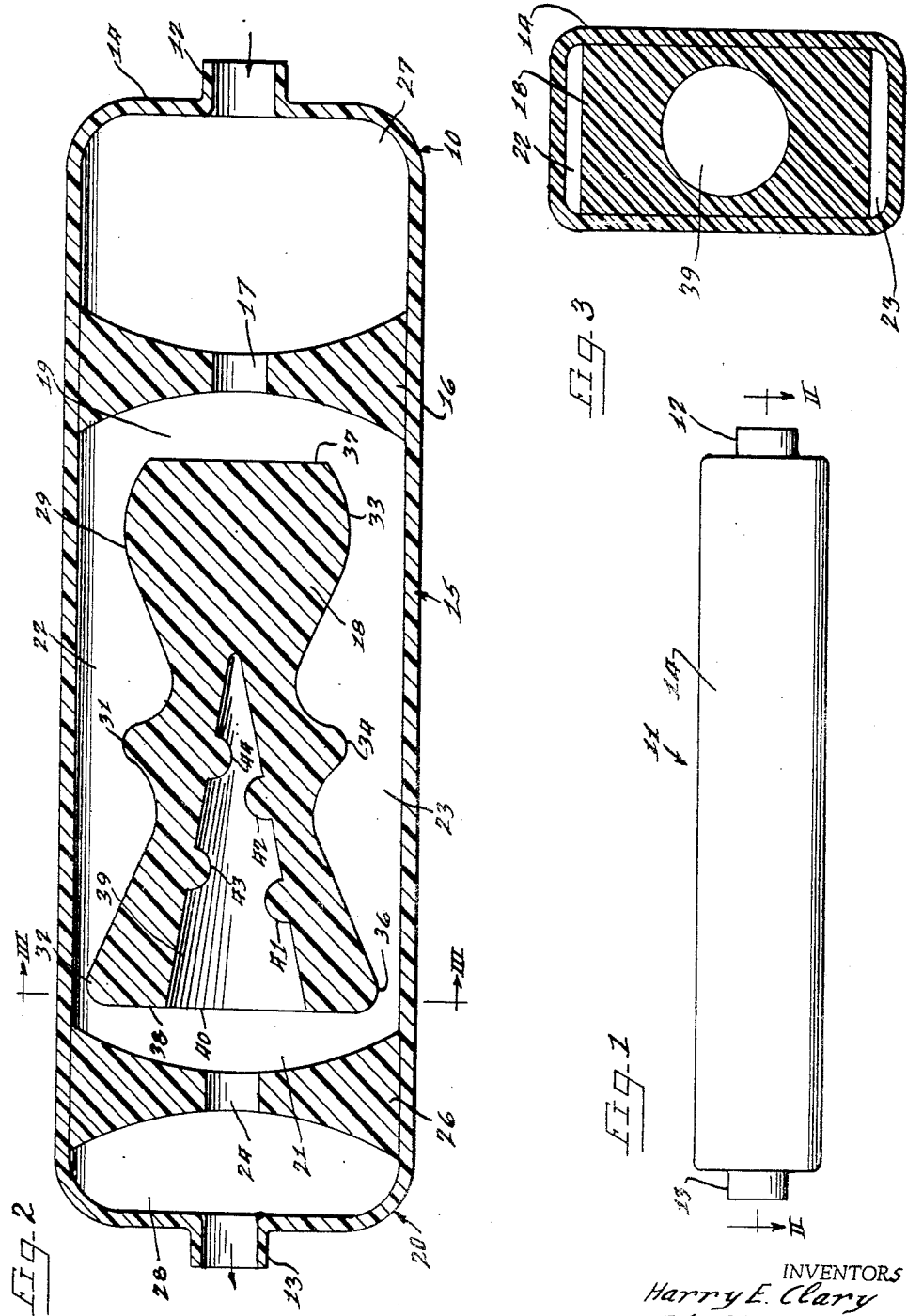
INVENTORS
Harry E. Clary
BY Phillip L. Bailey
ATTORNEYS Feb. 2, 1965
H. E. CLARY ETAL
3,168,162
NOISE FILTER
Filed Jan. 3, 1962
3 Sheets-Sheet 2
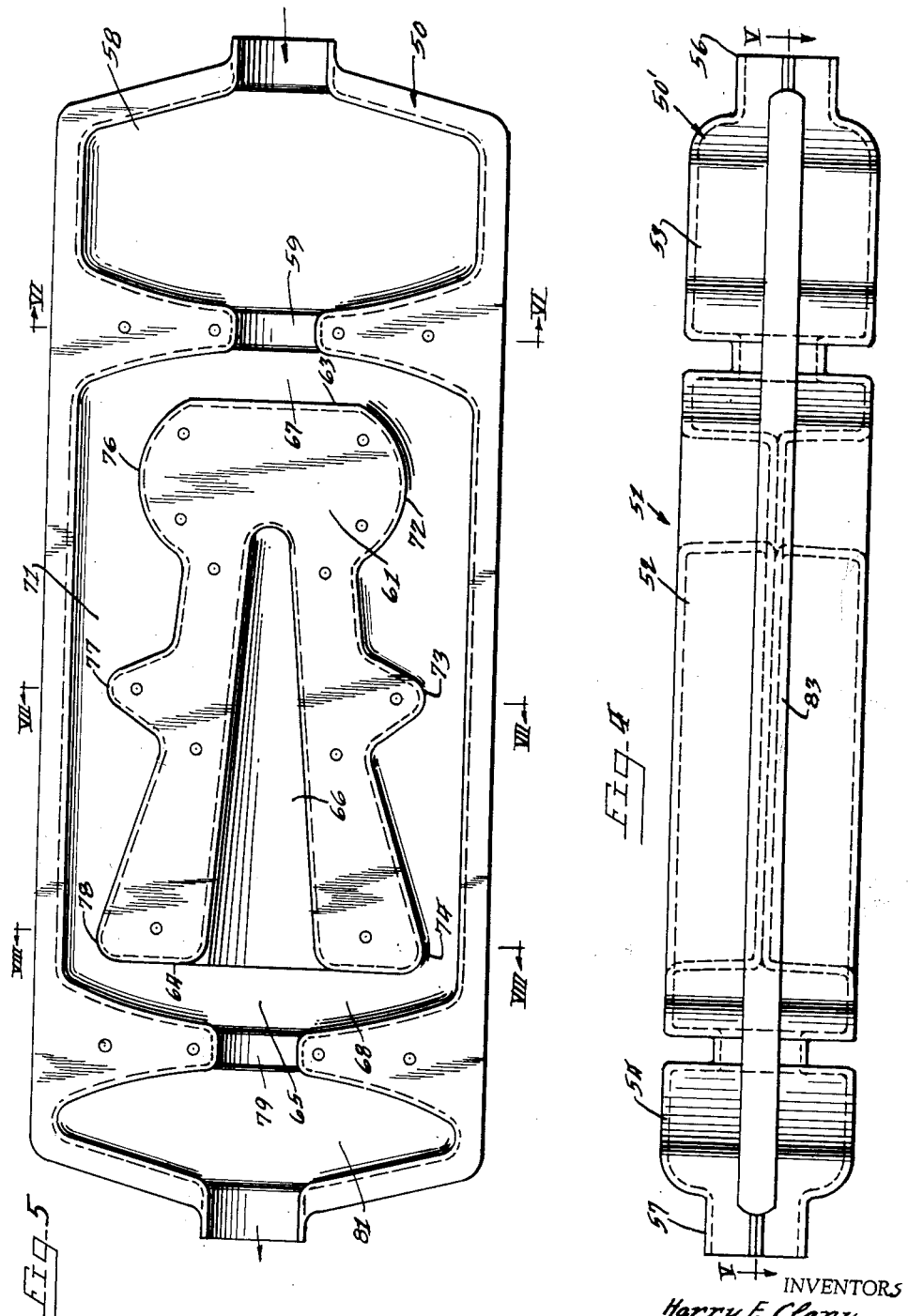
INVENTORS
Harry E. Clary
BY Phillip L. Bailey
ATTORNEYS

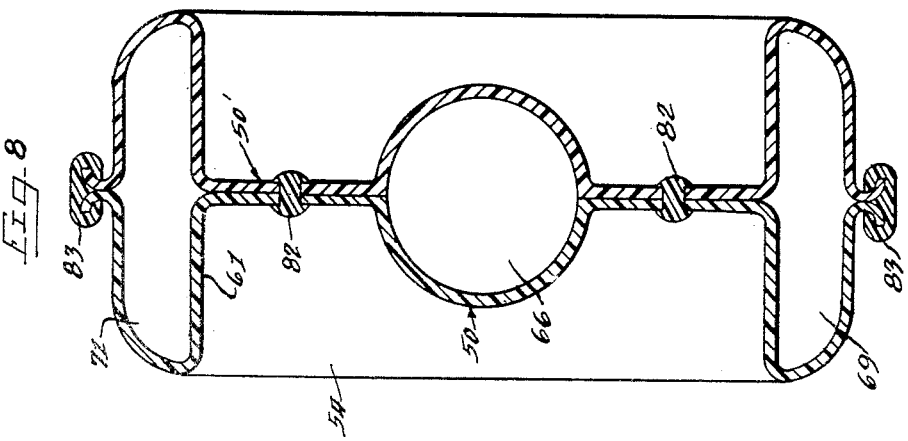
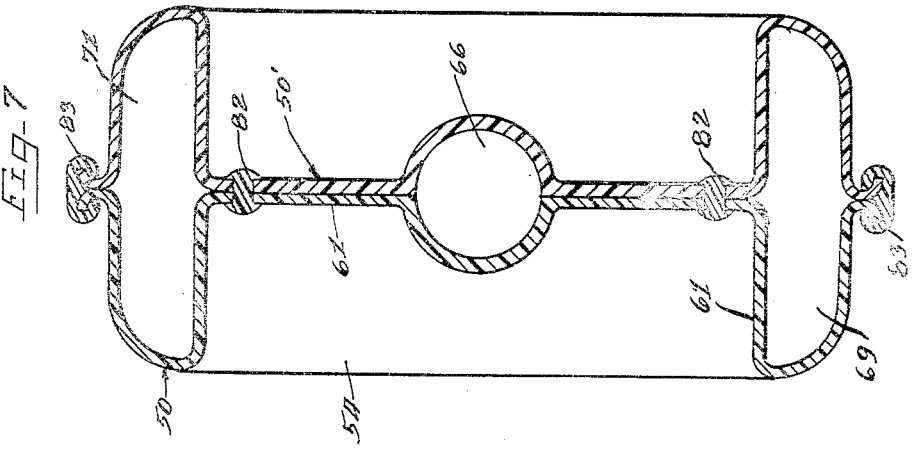
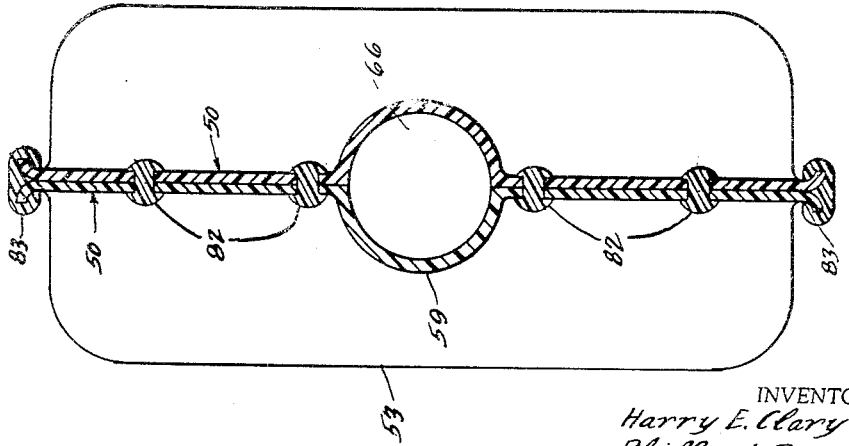

United States Patent Office 3,168,162
Patented Feb. 2, 1965

3,168,162
NOISE FILTER
Harry E. Clary, Chesterland, and Phillip L. Bailey, Wickliffe, Ohio, assignors to Thompson Ramo Wooldridge Inc., Cleveland, Ohio, a corporation of Ohio
Filed Jan. 3, 1962, Ser. No. 164,055
13 Claims. (Cl. 181—59)

This invention is generally related to silencers and more particularly to noise filters to reduce the noise level associated with the flow of gases.

Noise filters are used to reduce the noise level associated with exhaust gases from internal combustion engines, turbines, vacuum pumps, and similar devices. Difficulties were encountered in reducing the noise level from such devices without producing high back pressures. The conventional noise filters or mufflers utilize a multiplicity of baffles and resonant chambers of complex configurations and resulted in mufflers of extreme length and width. In an attempt to lower costs of such prior art mufflers, materials had to be used which would quickly corrode and rust. Further, such prior art mufflers, due to their complexities of design and multiplicity of parts, presented problems for quick and economical assemblage.

It is therefore an object of the present invention to provide a compact inexpensive and efficient noise filter.

It is another object of the instant invention to provide a noise filter to reduce noise level associated with flowing gases without excessive resistance to the flow of the gases.

It is another object of this invention to provide a noise filter having baffles and flow channels formed by joining two half casing sections.

It is a further object of this invention to provide a noise filter that has two joined halves, baffles and flow channels that are formed by convolutions or depressions in the outer shell of the filter.

It is further an object of this invention to provide a noise filter having a plurality of baffles and a plurality of flow channels and a resonant chamber formed by one of said baffles, said baffles and flow channels causing a series of expansions and contractions of gas and accompanying sound pressure waves flowing through said noise filter.

It is further an object of the instant invention to provide a method of economically filtering noise by flowing exhaust gases and accompanying sound pressure waves into a noise filter, expanding said gases and accompanying sound pressure waves then flowing said gases and accompanying sound pressure waves through a restriction, dividing the gases and accompanying sound pressure waves into a plurality of flow channels, subjecting the flow through said channels to a series of contractions and expansions, joining said divided flow at a restricted outlet passage, and flowing said gases and accompanying attenuated sound pressure waves to the atmosphere.

It is further an object of this invention to provide a method of filtering noise produced by the flow of gas, economically by flowing the gas and the accompanying sound pressure waves through a series of expansions and contractions.

It is further an object of the invention to provide a noise filter having series of baffles and a plurality of flow passages formed by convolutions or depressions in the outer wall of said noise filter, said baffles and flow channels causing a series of expansions and contractions of the gas and accompanying sound pressure waves.

On the drawings:

FIGURE 1 is a side elevational view of one embodiment of the muffler according to this invention;

FIGURE 2 is an enlarged longitudinal cross-sectional view of the muffler of FIGURE 1 taken along line II—II;

FIGURE 3 is an enlarged transverse cross-sectional view taken along line III—III of FIGURE 1;

FIGURE 4 is a side-elevational view of another embodiment of the muffler according to this invention;

FIGURE 5 is a longitudinal cross-sectional view of the muffler of FIGURE 4 taken along lines V—V;

FIGURE 6 is a transverse cross-sectional view taken along the lines VI—VI of FIGURE 5;

FIGURE 7 is a transverse cross-sectional view taken along the lines VII—VII of FIGURE 5, and FIGURE 8 is a transverse cross-sectional view taken along the lines VIII—VIII of FIGURE 5.

As shown on the drawings:

The instant invention advantageously utilizes techniques of molding, casting, rolling or stamping to form a noise filter. These techniques are employed to economically produce a noise filter or muffler which is molded in two separate halves that only need to be joined to form a completed noise filter or muffler. When the muffler is symmetrical, only one mold or stamp is needed because both halves are identical.

Because of the economical manner in which the filter or muffler is fabricated, the more expensive corrosion resistant materials can be used, such as, high impact strength reinforced plastic where surface conditions are not too severe, die cast aluminum is also feasible, and of course, either stainless or low carbon steel.

The filter is formed in two halves. Within each half is formed a series of convolutions in the shell of the muffler. The convolutions in each shell are made to coact with each other and provide a series of expanding and contracting flow passages and baffles when the two halves of the muffler are joined. The convolutions also form a resonant chamber within the muffler, converging in a direction opposite to the direction of flow of outlet gases. The expansion and contraction passages and the resonant chamber attenuate the sound pressure waves which accompany the flow of gases and thereby make them aurally agreeable.

The coacting convolutions form an expansion chamber followed by a restricted passage which leads to a dividing manifold that branches to two or more flow channels that converge at a space between a resonant chamber and a restricted outlet passage.

The exhaust gases and objectionable pulsating sound pressure waves, for example from an internal combustion engine, enter the muffler of the instant invention through a restriction. They pass therefrom into an expansion chamber from which they exit through a restricted passage, the restricted passage leads to a manifold that branches into two or more flow channels. The gases and sound waves flow through the flow channels where they are subjected to a series of expansions and contractions by one or more protrusions in the flow channels. The flow channels converge at a restricted exit passage which faces a resonant chamber that is between said flow channels. The gases emerge from the exit passage into the atmosphere, or may flow to another expansion chamber before passing through an outlet passage to the atmosphere with aurally agreeable sound pressure waves having low register long wave length, and flatter curved pulsations.

Referring to FIGURES 1–3, there is shown a muffler 11 having an inlet 12 and an outlet 13 connected to a housing 11. The muffler is shown as being of a substantially rectangular shape as shown by FIGURE 3 but it is understood that the muffler may be oval, cylindrical, or any design configuration desired. The muffler is formed by the housing shell 14 and is divided into three sections by two baffles. A first expansion section 10 is formed by an inlet baffle 16 and an inner surface of the shell 14. The inlet baffle 16 having a passage 17 therethrough is connected to shell 14 and forms a main section 15 with an outlet baffle 26 and the housing 14. A third expansion section 20 is also formed by the baffle 26 and the inner surface of the housing 14.

The two baffles 16 and 26 form with the housing 14 expansion chambers 27 and 28 in the first and third sections respectively. The inlet 12 enters the expansion chamber 27 and the outlet 13 exits from the expansion chamber 28.

The main second section has mounted therein a flow baffle 18 that forms respectively manifold chambers 19 and 21 with the inlet baffle 16 and outlet baffle 26. The baffle 18 also forms longitudinal flow channels 22 and 23 with the shell 14. The manifold chamber 19 connects to the restricted passage 17 and branches to the flow channels 22 and 23. The flow channels 22 and 23 extend longitudinally along the shell 14 and lead to the exit manifold chamber 21. The exit manifold converges to an exit restricted passage 24 formed by the outlet baffle 26.

On the sides of the baffle 18 are protrusions 29, 31, 32, 33, 34 and 36 which cause a series of expansions and contractions of the gases and sound pressure waves when they flow through the flow channels 22 and 23. The baffle 18 has an end wall 37 which forms the manifold chamber 19 with the baffle 16, and an exit end wall 38 which forms the manifold chamber 21 with the baffle 26.

A resonant chamber 39 is formed within the baffle 18 and has a mouth 40 formed by the end wall 38. The resonant chamber has sides that converge radially inward from the mouth 40 into the baffle 18 between the channels 22 and 23. On the sides of the resonant chamber are protrusions 41, 42, 43 and 44 which are used to increase the attenuation of sound pressure waves of frequencies peculiar to various sources of noise. These protrusions may be varied in number or shape or may be eliminated depending on the attenuation desired. Therefore, the cross-sectional area of the resonant chamber may be varied.

The muffler 11 is hooked up to a device such as an internal combustion engine, exhaust gases and disagreeable accompanying sound pressure waves, from the engine, flow through the inlet passage 12 into the expansion chamber 27. The expanded gases and sound waves converge and flow from the expansion chamber 27 through the restricted passage 17 and into the manifold chamber 19. The manifold chamber branches then to the two flow channels 22 and 23. However, depending upon the amount of gas that is to flow through the muffler, more flow channels may be used. The flow channels 22 and 23 subject each branched flow to contraction by the protrusions 29 and 33 respectively; followed by expansions; then contraction by protrusions 31 and 34; followed by a gradual expansion; and then contraction by the protrusion 32 and 36. The shape of the protrusions and the number of protrusions may be varied depending upon the source of noise and attenuation desired. The flow channels 22 and 23 flow the gas and sound pressure waves into the manifold 21. The manifold 21 converges and unites the divided flows at the restricted passage 24 that faces the mouth 40 of the resonant chamber 39. The gases and sound pressure waves pass through and enter the expansion chamber 28 where the gas exits through exit passage 13 with aurally agreeable sound pressure waves.

FIGURES 1–3 show the muffler as being made from molded plastic. It is understood that this muffler may be molded or casted from any suitable material, such as cast aluminum. It must also be borne in mind that the muffler may be molded in halves from a solid body whereby the depressions, that form the passages, appear to be scooped out from the inner walls of the muffler. Also, the baffles, as shown, were solid and it is understood that these may be rigid hollow bodies and further the baffles may be attached to the walls of the muffler in any suitable manner.

The baffle 26 is not essential and the manifold 21 may lead directly to the outlet 13. The baffle 26 however is desirable where the outlet passage 13 is not symmetrical with the mouth 40 of the resonant chamber 39.

FIGURES 4–8 show a muffler having the desired qualities of the instant invention. It is made by stamping or rolling sheet material such as steel. It is understood however that the muffler shown may be made by molding or casting suitable material.

FIGURE 4 shows a muffler 51 having a main section 52, an inlet expansion section 53, and an outlet expansion section 54. The section 53 having an exhaust gas inlet 56 and the section 54 having an exhaust gas outlet 57. The housing or casing for muffler 51 and its gas passageways are formed by pouring two contoured half-shells 50 and 50'.

Each half shell is contoured so that when they are joined the inner surface of their walls will form the passageways of the present invention. FIGURE 5 shows the half-shell 50 with a plurality of convolutions therein. The shell 50 first has convolutions to define the inlet expansion section 53. The convolutions for the inlet expansion section define the restricted inlet passage 56 which leads to an expansion chamber 58. The expansion chamber 58 has a restricted passage 59 axially aligned with inlet passage 56. The restricted passage 59 connects to the main section 52 with the inlet section 53. The convolutions in the shell at the main section 52 form a baffle 61 disposed concentrically therein. The baffle 61 has an inlet end 63 and an outlet end 64. Within the baffle 61 is a resonant chamber 66 which has a mouth 65 formed by the exit end 64, and has sides that converge radially within the baffle 61 in a direction opposite to the direction of flow of outlet gases.

The baffle 61 is formed by walls of the main portion 52 and the convolutions therein that form the entrance manifold 67, an exit manifold 68, axial flow channels 69 and 71, and resonant chamber 66. The sides of the axial flow channels 69 and 71 have respective protrusions 72 and 76, 73 and 77, and 74 and 78. These protrusions form a series of restricted and expanded areas in the flow channels to cause a series of expansions and contractions of the gases and accompanying sound pressure waves flowing through said channels.

The size, shape and the number of protrusions are varied to match the filter of the instant invention to the source of the noise and to achieve the desired attenuation.

The flow channels 69 and 71 are connected to the exit manifold 68 that converges and unites the gases and sound pressure waves at a restricted passage 79 and at the mouth 65 of the resonant chamber 66. The passage 79 connects the main silencing section 52 with the exit expansion section 54. The exit expansion section 54 has convolutions to form an expansion chamber 81 which is connected to the passage 79. The outlet 57 is formed in the exit expansion chamber 81 and is axially aligned with the passages 79, 59 and 56. The passages however do not have to be axially aligned with one another. This depends on the noise source and attenuation desired.

FIGURES 6–8 show how the muffler made up of two half-shells is joined and brings out further how the convolutions stamped or molded in the sheet material form the entrance 56, the expansion chamber 58, the passage 59, the manifold 67, the flow passages 69 and 71, the resonant chamber 66, the manifold 68, the passage 79, the expansion chamber 81 and the exit 57. The two half-shells are joined by rivets 82 and fasteners 83 or like fastening means.

The exit expansion chamber 54 is not essential but is desirable in applications where the outlet passage 57 is not symmetrical with the mouth of the resonant chamber 66. It is understood that more than two flow channels may be constructed in the main section 52. Therefore the transverse cross-sectional shape of the resonant chamber 66 can vary depending upon the shape of the outer shell and the number of flow passages around the baffle 61. Also, the size and shape of the muffler may be varied depending upon the type of sound to be attenuated.

It is also understood that the passageways shown in FIGURES 4-8 are not necessarily formed by convolutions in the muffler shell but may be formed by separate baffle means similar to those described in connection with FIGURES 1 to 3. The separate baffle means can be used to form one or all of the sections of the muffler and are joined to each half-shell in any suitable manner well known to the artisan.

By the use of our instant invention we have been able to economically produce a muffler that has 40% less back pressure than a conventional muffler of the same size.

It will be understood that modifications and variations of the foregoing preferred exemplary embodiment of the invention may be effected without departing from the spirit and scope of the invention as defined by the following claims.

We claim as our invention:

1. A noise silencer comprising:
   casing means forming an expansion entrance section, and a longitudinally extending main section,
   said entrance section forming an inlet passage and an outlet passage and an expansion chamber between said inlet and outlet passages,
   said entrance section inlet and outlet passages having smaller cross-sectional flow area than the entrance section expansion chamber,
   said main section having an inlet passage and an outlet passage with said inlet passage being connected to the entrance outlet passage to receive gas flow therefrom,
   said main section forming a plurality of spaced flow channels extending longitudinally therein,
   means providing each flow channel with a series of protrusions to provide expansive and contractive flow of gases and sound pressure waves therethrough,
   means providing an entrance manifold within the main section connected to the main section inlet and to one end of each flow channel to receive the gas flow from the inlet and divide the gas flow into a gas stream for each flow channel, and
   means providing an exit manifold connected to the other ends of said flow channels and said main section exit passage to receive the streams of gas from the flow channels and convergingly unite said streams to flow the united streams of gas through the main section outlet, 2. The noise silencer of claim 1 wherein the entrance manifold means has a relatively flat wall facing said main section inlet passage that the gas flow through said inlet passage is directed toward said flat wall.

3. A noise silencer comprising:
   housing means forming an expansion entrance section, and a longitudinally extending main section,
   said entrance section forming an inlet passage and an outlet passage and an expansion chamber between said inlet and outlet passages,
   said entrance section inlet and outlet passages having a smaller cross-sectional flow area than the entrance section expansion chamber,
   said main section having an inlet passage and an outlet passage with said inlet passage being connected to the entrance outlet passage to receive gas flow therefrom,
   said main section forming a plurality of spaced longitudinally extending flow channels therein, means providing each flow channel with a series of protrusions to provide expansive and contractive flow of gases and sound pressure waves therethrough,
   a resonator positioned between said flow channels and having a resonator mouth facing the main section outlet means providing an entrance manifold within the main section connected to the main section inlet and to one end of each flow channel to receive the gas flow from the inlet and divide the gas flow into a gas stream for each flow channel, and
   means providing an exit manifold connected to the other ends of said flow channels and said main section exit passage to receive the streams of gas from the flow channels and convergingly unite said streams to flow the united streams of gas through the main section outlet.

4. A noise silencer adapted to receive flowing gases accompanied by sound pressure waves comprising:
   housing means forming an expansion entrance section, and a longitudinally extending main section,
   said entrance section forming an inlet passage and an outlet passage and an expansion chamber between said inlet and outlet passages,
   said entrance section inlet and outlet passages having a smaller cross-sectional flow area than the entrance section expansion chamber,
   said main section having an inlet passage and an outlet passage with said inlet passage being connected to the entrance outlet passage to receive gas flow therefrom,
   said main section forming a plurality of spaced longitudinally extending flow channels therein,
   means providing each flow channel with a series of protrusions to provide expansive and contractive flow of gases and sound pressure waves therethrough,
   a resonator positioned between said flow channels and having a resonator mouth facing the main section outlet, said resonator having a resonator chamber converging from said resonator mouth in a direction opposite to the flow of gases through the channels,
   means providing an entrance manifold connected to the main section inlet and to one end of each flow channel to receive the gas flow from the inlet and divide the gas flow into a gas stream for each flow channel, and means providing an exit manifold connected to the other ends of said flow channels and said main section exit passage to receive the streams of gas from the flow channels and convergingly unite said streams to flow the united streams of gas through the main section outlet.

5. A muffler providing attenuation of sound pressure waves that accompany the flowing of gases comprising:
   a housing having axially aligned inlet and outlet passages,
   means forming an expansion entrance section, and a longitudinally extending main section within said housing, said entrance section having an inlet passage connected to said housing inlet and an outlet passage and an expansion chamber between said inlet and outlet passages, said entrance section inlet and outlet passages having a smaller cross-sectional flow area than the entrance section expansion chamber,
   said main section having an inlet passage and an outlet passage with said inlet passage being connected to the entrance outlet passage to receive gas flow therefrom and the outlet passage being connected to the housing outlet,
   means forming a plurality of spaced longitudinally extending flow channels within said main section,
   means providing each flow channel with a series of protrusions to provide expansive and contractive flow of gases and sound pressure waves therethrough,
   a resonator positioned between said flow channels and having a resonator mouth facing the main section outlet, said resonator having a resonator chamber converging from said resonator mouth in a direction opposite to the flow of gases through the channels,
   means providing an entrance manifold connected to the main section inlet and to one end of each flow channel to receive the gas flow from the inlet and divide the gas flow into a gas stream for each flow channel, and providing an exit manifold connected to the other ends of said flow channels and said main section exit passage to receive the streams of gas from the flow channels and convergingly unite said streams to flow the united streams of gas through the main section outlet, whereby sound pressure waves are attenuated to an aurally desirable level and excessive backup pressures are substantially prevented.

6. A muffler providing attenuation of sound pressure waves that accompany the flowing of gases comprising:

a housing having axially aligned inlet and outlet passages, means forming an expansion entrance section, a longitudinally extending main section, and an expansion exit section within said housing said entrance section having an inlet passage continuous with said housing inlet and an outlet passage and an expansion chamber between said inlet and outlet passages, said entrance section inlet and outlet passages having a smaller cross-sectional flow area than the entrance section expansion chamber, said main section having an inlet passage and an outlet passage with said inlet passage being continuous with the entrance outlet passage to receive gas flow therefrom, said main section having a plurality of spaced longitudinally extending flow channels formed therein, means providing each flow channel with a series of protrusions to provide expansive and contractive flow of gases and sound pressure waves therethrough, a resonator positioned between said flow channels and having a resonator mouth facing the main section outlet, said resonator having a resonator chamber converging from said resonator mouth in a direction opposite to the flow of gases through the channels, said resonator chamber side walls having protrusions thereon, means providing an entrance manifold connected to the main section inlet and to one end of each flow channel to receive the gas flow from the inlet and divide the gas flow into a gas stream for each flow channel, means providing an exit manifold connected to the other ends of said flow channels and said main section exit passage to receive the streams of gas from the flow channels and convergingly unite said streams to flow the united streams of gas through the main section outlet, and said exit chamber section having an inlet continuous with the main section outlet, an outlet continuous with the housing outlet, and an expansion chamber between the inlet and outlet having a cross-section flow area greater than that of the inlet and outlet whereby sound pressure waves are attenuated to an aurally desirable level and excessive backup pressures are substantially prevented.

7. A muffler providing attenuation of sound pressure waves that accompany the flowing of gases comprising:

a housing formed of two joined halves of stamped material with each half having corresponding convolutions, said convolutions forming a muffler inlet and outlet, an expansion entrance section, and a longitudinally extending main section, said entrance section having an inlet continuous with said muffler inlet, an outlet, and an expansion chamber between said inlet and outlet, said entrance section inlet and outlet having a smaller cross-sectional flow area than the entrance section expansion chamber, said main section having an inlet passage and an outlet passage with said inlet passage being continuous with the entrance outlet to receive gas flow therefrom and the outlet passage being connected to the muffler outlet, said convolutions forming a plurality of spaced longitudinally extending flow channels with said main section means providing each flow channel with a series of protrusions to provide expansive and contractive flow of gases and sound pressure waves therethrough, a resonator positioned between said flow channels and having a resonator mouth facing the main section outlet, said resonator having a resonator chamber converging from said resonator mouth in a direction opposite to the flow of gases through the channel, said convolutions forming an entrance manifold connected to the main section inlet and to one end of each flow channel to receive a gas flow from the inlet and divide the gas flow into a stream for each flow channel, and said convolutions forming an exit manifold connected to the other end of said flow channels and said main section exit passage to receive the streams of gas from the flow channels and convergingly unite said streams to flow the united streams of gas through the main section outlet, whereby sound pressure waves are attenuated to an aurally desirable level and excessive backup pressures are substantially prevented.

8. A muffler providing attenuation of sound pressure waves that accompany the flowing of gases comprising:

a housing formed of two joined halves of stamped material with each half having corresponding convolutions, said convolutions forming a muffler inlet and outlet, an entrance section, a longitudinally extending main section and an exit section with said main section having an axial length greater than the axial length of the entrance and exit sections, said entrance section having an inlet continuous with said muffler inlet, an outlet, and an expansion chamber between said inlet and outlet, said entrance section inlet and outlet having a smaller cross-sectional flow area than the entrance section expansion chamber, said main section having an inlet passage and an outlet passage with said inlet passage being continuous with the entrance outlet to receive gas flow therefrom, said convolutions forming two circumferentially spaced longitudinally extending flow channels within said main section, means providing each flow channel with a series of protrusions to provide expansive and contractive flow of gases and sound pressure waves therethrough, a resonator positioned between said flow channels and having a resonator mouth facing the main section outlet, said resonator having a resonator chamber converging from said resonator mouth in a direction opposite to the flow of gases through the channels, said convolutions forming an entrance manifold connected to the main section inlet and to one end of each flow channel to receive the gas flow from the inlet and divide the gas flow into a gas stream for each flow channel, said convolutions forming an exit manifold connected to the other end of said flow channels and said main section exit passage to receive the streams of gas from the flow channels and convergingly unite said streams to flow the united streams of gas through the main section outlet, said exit chamber section having an inlet continuous with the main section outlet, an outlet continuous with the housing outlet and an expansion chamber between the inlet and outlet having a cross-section flow area greater than that of the inlet and outlet, said muffler inlet and outlet, said entrance section inlet and outlet, said main section inlet and outlet, and said exit section inlet and outlet being axially and concentrically aligned with each other, whereby sound pressure waves are attenuated to an aurally desirable level and excessive backup pressures are substantially prevented.

9. The muffler of claim 8 wherein the entrance manifold has a relatively flat surface facing said main section inlet passage such that gas flow through said inlet passage is directed toward said flat surface.

10. A muffler providing attenuation of sound pressure waves that accompany the flowing of gases comprising:
   a housing formed of two joined halves of molded material with each half having corresponding convolutions, an expansion section, a longitudinally extending main section, and an exit section with said main section having an axial length greater than the axial length of the entrance and exit sections,
   said entrance section having an inlet continuous with the muffler inlet, an outlet, and an expansion chamber between said inlet and outlet,
   said entrance section inlet and outlet having a smaller cross-sectional flow area than the entrance section expansion chamber,
   said main section having an inlet passage and an outlet passage with said inlet passage being continuous with the entrance outlet to receive gas flow therefrom
   said convolutions forming a plurality of spaced longitudinally extending flow channels within said main section said convolutions providing each flow channel with a series of protrusions to provide expansive and contractive flow of gases and sound pressure waves therethrough,
   said convolutions forming a resonator between said flow channels and having a resonator mouth facing the main section outlet, said resonator having a resonator chamber converging from said resonator mouth in a direction opposite to the flow of gases through the channels,
   said convolutions forming an entrance manifold connected to the main section inlet and to one end of each flow channel to receive the gas flow from the inlet and divide the gas flow into gas stream for each flow channel,
   said convolutions forming an exit manifold connected to the other end of said flow channels and said main section exit passage to receive the streams of gas from the flow channels and convergingly unite said streams to flow the united streams of gas through the main section outlet, and
   said exit chamber section having an inlet continuous with the main section outlet, an outlet continuous with the housing outlet, and an expansion chamber between the inlet and outlet having a cross-section flow area greater than that of the inlet and outlet whereby sound pressure waves are attenuated to an aurally desirable level and excessive backup pressures are substantially prevented.

11. A muffler providing attenuation of sound pressure waves that accompany the flowing of gases comprising:
   a housing having a muffler inlet and outlet,
   baffle means mounted within said housing and dividing the interior of said housing into an entrance section, and a longitudinally extending main section,
   said entrance section having an inlet continuous with the muffler inlet, an outlet and an expansion chamber between said inlet and outlet,
   said entrance section inlet and outlet having a smaller cross-sectional flow area than the entrance section expansion chamber,
   said main section having an inlet passage and an outlet passage with said inlet passage being continuous with the entrance outlet to receive gas flow therefrom,
   a main section baffle connected within said housing forming a plurality of spaced longitudinally extending flow channels with said housing within said main section,
   said main section baffle providing each flow channel with a series of protrusions to provide expansive and contractive flow of gases and sound pressure waves therethrough,
   said main section baffle forming a resonator between said flow channels and having a resonator mouth facing the main section outlet,
   said resonator having a resonator chamber converging from said resonator mouth in a direction opposite to the flow of gases through the channels,
   said main section baffle forming an entrance manifold connected to the main section inlet and to one end of each flow channel to receive the gas flow from the inlet and divide the gas flow into a stream for each flow channel, and
   said main section baffle forming an exit manifold connected to the other end of said flow channels and said main section exit passage to receive the streams of gas from the flow channels and convergingly unite said streams to flow the united streams of gas through the main section outlet, whereby sound pressure waves are attenuated to an aurally desirable level and excessive backup pressures are substantially prevented.

12. A plastic muffler comprising:
   casing means forming an entrance section, and a longitudinally extending main section with said main section having an axial length greater than the axial length of the entrance section,
   said entrance section forming axially aligned circular inlet and outlet passages and an expansion chamber between said inlet and outlet,
   said entrance section inlet and outlet having a smaller cross-sectional flow area than the entrance section expansion chamber,
   said main section having axially aligned circular inlet and outlet passages with said inlet passage being connected to the entrance outlet to receive gas flow therefrom,
   means forming a plurality of spaced longitudinally extending flow channels within said main section,
   means providing each flow channel with a series of protrusions to provide expansive and contractive flow of gases and sound pressure waves therethrough,
   a resonator positioned between said flow channels and having a resonator mouth facing the main section outlet, said resonator having a resonator chamber converging from said resonator mouth in a direction opposite to the flow of gases through the channels,
   means forming an entrance manifold connected to the main section inlet and to one end of each flow channel to receive the gas flow from the inlet and divide the gas flow into a stream for each flow channel, and
   means providing an exit manifold connected to the other end of said flow channels and said main section exit passage to receive the streams of gas from the flow channels and convergingly unite said streams to flow the united streams of gas through the main section outlet, whereby sound pressure waves are attenuated to an aurally desirable level and excessive backup pressures are substantially prevented.

13. A muffler providing attenuation of sound pressure waves that accompany the flowing of gases comprising:
   a housing means having an expansion entrance section, and a longitudinally extending main section,
   said entrance section having an inlet passage and an outlet passage and an expansion chamber between said inlet and outlet passages, said entrance section inlet and outlet passages having smaller cross-sectional flow area than the entrance section expansion chamber, said main section having an inlet passage and an outlet passage with said inlet passage being connected to the entrance outlet passage to receive gas flow therefrom, a baffle means mounted in said main section, said baffle means having two inner side walls spaced inwardly from the main section interior, top and bottom walls interconnecting the said walls, and a flat end wall, said baffle means top and bottom walls attached to the main section interior such that two longitudinally extending spaced flow channels are formed with the baffle inner side walls and the main section interior, said inner baffle walls diverging-converging-diverging along the length thereof to provide contractive and expansive flow of gases and sound pressure waves therethrough, said baffle flat end wall facing said main section inlet and being spaced therefrom to provide an entrance manifold within the main section connected to the main section inlet and to one end of each flow channel to receive the gas flow from the inlet and divide the gas flow into a gas stream for each flow channel, and means providing an exit manifold connected to the other ends of said flow channels and said main section exit passage to receive the streams of gas from the flow channels and convergingly unite said streams to flow the united streams of gas through the main section outlet.

References Cited in the file of this patent
UNITED STATES PATENTS

| | | |
|---|---|---|
| 2,071,351 | McNamara | Feb. 23, 1937 |
| 2,110,986 | Kadenacy | Mar. 15, 1938 |
| 2,484,827 | Harley | Oct. 18, 1949 |

FOREIGN PATENTS

| | | |
|---|---|---|
| 234,854 | Switzerland | Feb. 16, 1945 |
| 411,250 | Great Britain | June 7, 1934 |
| 577,524 | Italy | June 4, 1958 |